United States Patent Office 3,824,274
Patented July 16, 1974

3,824,274
ESTERS OF PHENOXYPHENYLALKENOIC ACIDS
Albrecht Franke, Ludwigshafen, Germany, and Walter Traber, Riehen, Switzerland, assignors to Ciba-Geigy Corporation, Ardsley, N.Y.
No Drawing. Filed May 12, 1972, Ser. No. 252,783
Claims priority, application Switzerland, May 15, 1971, 7,205/71; Apr. 6, 1972, 5,087/72
Int. Cl. C07c 69/76
U.S. Cl. 260—473 R                 11 Claims

ABSTRACT OF THE DISCLOSURE

Compounds of the formula

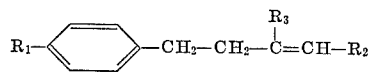

wherein $R_1$ represents a phenyl, phenoxy, phenylthio or cyclohexyl radical which is optionally substituted by halogen, nitro, alkyl and/or alkoxy, or a phenyl or cyclohexyl radical which is bonded via an alkylene, alkyleneoxy or alkylenethio bridge member, $R_2$ represents cyano, carbamoyl, an alkoxycarbonyl, alkenyloxycarbonyl, alkinyloxycarbonyl, alkylcarbamoyl or dialkylcarbamoyl radical and $R_3$ represents hydrogen or alkyl, their manufacture and agents for influencing the development of insects are disclosed.

---

The present invention relates to new 4-phenyl-2-methyl-1-butene-1-carboxylc acid derivatives, their manufacture and their use in influencing the development of insects.

The new compounds correspond to the formula

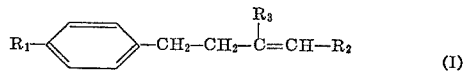   (I)

wherein $R_1$ represents a phenyl, phenoxy, phenylthio or cyclohexyl radical which is optionally substituted by halogen, nitro, alkyl and/or alkoxy, or a phenyl or cyclohexyl radical which is bonded via an alkylene, alkyleneoxy or alkylenethio bridge member, $R_2$ represents cyano, carbamoyl, an alkoxycarbonyl, alkenyloxycarbonyl, alkinyloxycarbamoyl, alkylcarbamoyl or dialkylcarbamoyl radical, and $R_3$ represents hydrogen or alkyl.

By an alkylene, alkyleneoxy or alkylenethio bridge member is meant a straight-chain or branched radical containing from 1 to 4 carbon atoms, in particular a —CH$_2$—, —CH$_2$—CH$_2$—, —CH$_2$—O—,

—CH$_2$—CH$_2$—O—,

—CH$_2$—S—, —CH$_2$—CH$_2$—S—, —CH$_2$—CH$_2$—CH$_2$—, radical.

Alkyl and alkoxy radicals are lower radicals containing from 1 to 5 carbon atoms, for example methyl, ethyl, n-propyl, isopropyl, n-butyl, isobutyl, tert.butyl, n-pentyl, iso-amyl, methoxy, ethoxy propoxy isopropoxy n-butoxy, n-pentoxy, isoamyloxy, etc.

By halogen is meant fluorine, chlorine, bromine and iodine, but chiefly chlorine and bromine.

The alkenyloxy or alkinyloxy moiety of an alkenyloxy- or alkinyloxycarbonyl radical contain from 3 to 6, preferably 3 to 4 carbon atoms.

Examples of such radicals include allyloxy-, methallyloxy-, crotyloxy- and propargyloxycarbonyl.

Particularly important compounds are those of the formula

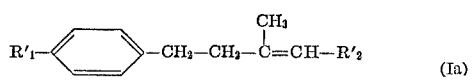   (Ia)

wherein $R'_1$ represents a phenoxy or phenylthio radical which is optionally substituted by $C_1$–$C_4$ alkyl and $R'_2$ represents methoxy-, ethoxy-, isopropoxy-, allyloxy-, propargyloxycarbonyl or diethylcarbamoyl.

The active substances of the formula I are manufactured in known manner by reacting a compound of the formula

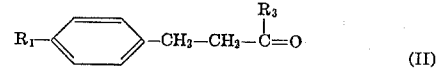   (II)

wherein $R_1$ and $R_3$ have the meanings given for formula I, with a phosphonic ester of the formula

   (III)

wherein $R_4$ and $R_5$ each represent $C_1$–$C_4$ alkoxy and $R_2$ has the meaning given for formula I, in the presence of a base.

Suitable bases are alcoholates, amides or hydroxides of alkali or alkaline earth metals, as well as strong basic amines.

The process is carried out in solvents and diluents which are inert towards the reactants, for example in aromatic hydrocarbons such as benzene, toluene, xylene, also alcohols such as methanol, ethanol, propanol, isopropanol or butanols, glycols; ethers, such as diisopropyl ether, tetrahydrofuran, dioxan or N,N-dialkylated amides, such as dialkylformamides; and N-methylpyrolidone, sulphoxides.

The reaction temperatures are in the range from 0–150° C., but preferably from 20–80° C.

The starting materials of the formula (II) can be manufactured, for example, by the process described in J.A.C.S. 80, 5524 ff. (1958). In the manufacture of the compounds of the formula I, both possible geometric isomers are formed. The described compounds partly constitute mixtures of these isomers as occur during the synthesis.

In active substances of the formula I are suitable for combating plant hygiene and storage pests. In contrast to the majority of the hitherto known insecticides which in the form of contact or ingest poisons kill, paralyse or expel the pests, the active substances of the formula I influence their hormonal system.

Thus in the case of insects, for example, the shedding (in the case of hemimetabole) or the metamorphosis to the imago (in the case of holometabola), the laying of viable eggs and the development of deposited normal eggs is disturbed. The sequence of generations is interrupted and the pests are thus indirectly killed. The butene-carboxylic acid derivatives are virtually non-poisonous for warm blooded animals. Moreover, these compounds are easily decomposed so that a cumulation is impossible.

The new butene-carboxylic acid derivatives may be used primarily for combating the following plant, storage and hygiene pests:

Orthoptera:
    Acrididae               Blattidae
    Gryllidae
Isoptera: Kalotermitidae
Hemiptera:
    Miridae                Reduviidae
    Piesmidae            Jassidae
    Lygaeidae            Eriosomatidae
    Pyrrhocorodae       Lecaniidae
    Pentatomidae        Aphididae
    Cimicidae            Psyllidae
Coleoptera:
    Carabidae            Cucujidae
    Elateridae           Chrysomelidae
    Coccinellidae       Curculionidae
    Tenebrionidae       Scolytidae
    Dermestidae         Scarabaeidae Lepidoptera:
- Pyralidae
- Phyticidae
- Pyraustidae
- Crambidae
- Tortricidae
- Galleriidae
- Lyonetiidae
- Yponomeutidae
- Pieridae
- Plutellidae
- Lymantriidae
- Noctuidae Diptera:
- Culicidae
- Simuliidae
- Tipulidae The compounds of the formula I can be used as pure concentrate or together with suitable carriers and/or additives. Suitable carriers and additives can be solid or liquid and correspond to the substances conventionally used in formulation technique such, for example, as solvents, dispersants, wetting agents, adhesives, thickeners, binders and/or fertilizers.

The agents accordng to the invention are manufactured in known manner by intimately mixing and/or grinding active substances of the formula I with the suitable carriers, optionally with the addition of dispersants or solvents which are inert towards the active substances. The active substances may be available and can be used in the following forms:

Solid forms: dusts, tracking agents, granules, coated granules, impregnated granules and homogeneous granules.

Liquid forms:
 (a) active substances which are dispersible in water: wettable powders, pastes, emulsions;
 (b) solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminium silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal, etc. These substances can either be used alone or in admixture with one another.

Granules can be very easily manufactured by dissolving an active substance of the formula I in an organic solvent and applying the resulting solution to a granulated material, for example attapulgite, $SiO_2$, granicalcium, bentonite etc. and then evaporating the solvent.

Polymer granules can also be manufactured by mixing the active substances of the formula I with polymerisable compounds (urea/formaldehyde; dicyandiamide/formaldehyde; melamine/formaldehyde or others), whereupon a mild polymerisation is carried out that does not affect the active substances and in the process of which the granulation is carried out during the gel formation. It is more advantageous to impregnate finished, porous polymer granules (urea/formaldehyde, polyacrylonitrile, polyester or others) which have a specific surface area and a favourable predeterminable adsorption/desorption ratio, with the active substances, for example in the form of their solutions (in a low boiling solvent) and to remove the solvent. Polymer granules of this kind in the form of microgranules having a bulk density of 300 g./litre to 600 g./litre can also be manufactured with the aid of atomisers. The dusting can be carried out from aircraft over extensive areas of cultures of useful plants.

It is also possible to obtain granules by compacting the carrier with the active substance and carriers and subsequently comminuting the product.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulfonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted with water to any concentration desired. They consists of active substance, carrier, optional additives which stabilize the active substance, surface-active substances and anti-foam agents and, optionally, solvents.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenyl and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are so mixed, ground, sieved and strained with the additives mentioned above that, in wettable powders, the solid particle size of from 0.02 to 0.04 and in pastes, of 0.03 is not exceeded. To produce emulsifiable concentrates and pastes, dispersing agents such as those given in the previous paragraphs, organic solvents and water are used. Examples of suitable solvents are the following: alcohols, benzene, xylene, toluene, dimethyl sulfoxide, and mineral oil fractions boiling between 120 and 350° C. The solvents must be practically odorless, not phytotoxic, inert to the active substances and not readily inflammable.

Furthermore, the agents according to the invention can be applied in the form of solutions. For this purpose the active substance or several active substances of general formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents.

The content of active substance in the above described agents is between 0.1% to 95%, in which connection it should be mentioned that in the case of application from aircraft or some other suitable means of application, it is possible to use concentrations of up to 99.5% or even pure active substance.

The active substances of the formula I can, for example, be formulated as follows:

DUSTS

The following substances are used to manufacture (a) a 5% and (b) a 2% dust:

(a)

5 parts of active substance
95 parts of talcum (b)

2 parts of active substance
1 part of highly disperse silica
97 parts of talcum.

The active substances are mixed with the carriers and ground.

GRANULES

The following substances are used to manufacture 5% granules:

5 parts of active substance
0.25 part of epichlorohydrin
0.25 part of cetyl polyglycol ether
3.50 parts of polyethylene glycol
91 parts of kaolin (particle size=0.3–0.8 mm.).

The active substance is mixed with epichlorohydrin and the mixture dissolved with 6 parts of acetone, then polyethylene glycol and cetyl polyglycol ether are added. The resulting solution is sprayed on kaolin and the acetone is subsequently evaporated in vacuo.

WETTABLE POWDER

The following constituents are used to manufacture a 10% wettable powder:

(a)

40 parts of active substance
5 parts of sodium lignin sulphonate
1 part of sodium dibutylnaphthalenesulphonic acid
54 parts of silica;

(b)

25 parts of active substance
4.5 parts of calcium lignin sulphonate
1.9 parts of Champagne chalk/hydroxyethyl cellulose mixture (1:1)
1.5 parts of sodium dibutylnaphthalenesulphonate
19.5 parts of silica
19.5 parts of Champagne chalk
28.1 parts of kaolin;

(c)

25 parts of active substance
2.5 parts of isooctylphenoxy-polyoxyethylene ethanol
1.7 parts of Champagne chalk/hydroxyethyl cellulose mixture (1:1)
8.3 parts of sodium aluminium silicate
16.5 parts of silica
46 parts of kaolin;

(d)

10 parts of active substance
3 parts of mixture of sodium salt of saturated fatty alcohol sulphates
5 parts of naphthalenesulphonic acid/formaldehyde condensate
82 parts of kaolin.

The active substances are intimately mixed in appropriate mixing device with the adjuvants and ground in corresponding mills and rollors. Wettable powder is obtained which can be diluted with water to suspensions of every desired concentration.

EMULSIFIABLE CONCENTRATES

The following substances are used to manufacture (a) a 10% and (b) a 25% emulsifiable concentrate:

(a)

10 parts of active substance
3.4 parts of epoxidised vegetable oil
13.4 parts of a combination emulsifier consisting of fatty alcohol polyglycol ether and calsium alkylarylsulphonate
40 parts of dimethyl formamide
43.2 parts of xylene;

(b)

25 parts of active substance
2.5 parts of epoxidised vegetable oil
10 parts of an alkylarylsulphonate/fatty alcohol polyglycol ether mixture
5 parts of dimethyl formamide
57.5 parts of xylene.

Emulsion of every desired concentration can be manufactured by diluting these concentrates with water.

SPRAYS

The following constituents are used to manufacture a 5% spray:

5 parts of active substance
1 part of epichlorohydrin
94 parts of petroleum ether (boiling limits: 160–190° C.).

This solution is sprayed using pressure sprays.

The agents described herein may be mixed with other biocidal active substances or agents. Besides the cited compounds of the general formula I, the new agents may thus contain, for example, insecticides, fungicides, bactericides, fungistatic agents, bacteriostatic agents, nematocides or herbicides, in order to broaden the activity spectrum.

EXAMPLE 1

1.1 While stirring, hydrogen chloride is passed for 16 hours at 90° C. into a mixture of 816 g. of diphenyl ether, 3.5 kg. of concentrated hydrochloric acid and 520 g. of 36% formaldehyde solution. The solution is then poured into ice water and extracted with diethyl ether/petroleum ether mixture. The organic phase is washed several times with water, dried over sodium sulphate with the addition of a small amount of potassium carbonate and evaporated. The residue is distilled in vacuo with the addition of potassium carbonate. Pure phenoxybenzyl chloride passes over at 143–156° C./2 mm.

1.21 16 Grams of sodium are dissolved in 400 ml. of absolute ethanol. Within 1 hour 182 g. of ethyl acetoacetate are added dropwise to the still hot solution and then 156 g. of phenoxybenzyl chloride are added at boiling temperature over the course of 3 hours. The mixture is boiled under reflux for a further 15 hours, cooled, the white precipitate which has formed filtered off and the solution evaporated. 100 Grams of sodium hydroxide in 2 litres of water are added to the residue and the mixture is stirred for 15 hours under reflux. It is then extracted with diethyl ether and the organic phases are dried and evaporated. The residue is distilled in a high vacuum to yield 4-(4'-phenoxy-phenyl)-2-butanone which boils at 144.5–148° C./0.03 mm.

1.22 34 Grams of diphenyl ether dissolved in 100 ml. of dry methylene chloride are added dropwise at 10–20° C. to a suspension of 35 g. of anhydrous aluminum chloride in 100 ml. of dry methylene chloride. Within 30 minutes, 14 g. of methylvinyl ketone in 50 ml. of methylene chloride are added to the mixture while cooling from time to time at 15–20° C. The reaction suspension is then stirred for 2½ hours at 5–10° C. and subsequently poured on 1 litre of ice water. After the suspension has been strongly acidified with concentrated hydrochloric acid, the methylene chloride solution is isolated and the residual aqueous suspension extracted with 3× 100 ml. of methylene chloride. The combined methylene chloride extracts are washed until neutral with 3× 400 ml. of water, dried with sodium sulphate and filtered off. The methylene chloride is distilled off to leave 46.3 g. of a green oil, which is fractionated in a high vacuum, yielding 23 g. of 4-(4'-phenoxyphenyl)-2-butanone with a boiling point of 135–136° C. at 0.001 Torr; $n_D^{20}$=1.5648.

1.3  30 Grams of dimethoxy-phosphinyl methyl acetate are slowly added dropwise at room temperature to a mixture of 24 g. of 4-(4'-phenoxy-phenyl)-2-butanone, 7.2 g. of approx. 50% sodium hydride and 750 ml. of absolute benzene. A grey gelatinous substance forms which is stirred for a further 15 hours. Then 500 ml. of purest dimethyl formamide are added and stirring is continued again for 5 hours. The mixture is then pured into water and extracted with diethyl ether. The organic phase is washed repeatedly with water, dried over sodium sulphate and evaporated. The residue is chromatographed on about 300 g. of silica gel using benzene as eluant, to yield a cis-trans mixture of the compound of the formula

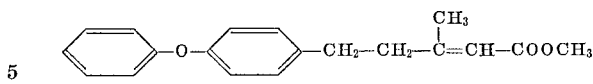

After repeated chromatography with silica gel and using benzene/petroleum ether (1:1) as eluant, about ⅓ pure cis-compound and ⅔ pure trans-compound are obtained.

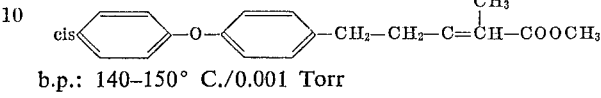

b.p.: 140–150° C./0.001 Torr

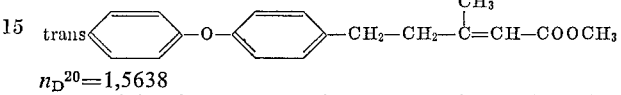

$n_D^{20}$=1,5638

The following compounds are manufactured analogously:

| Active substance | Physical data |
|---|---|
| 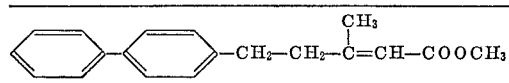 | $n_D^{20}$=1.5782 |
| 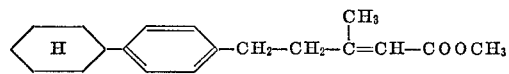 | $n_D^{20}$=1.5295 |
| 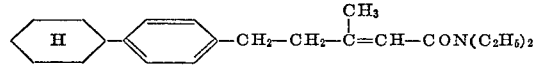 | $n_D^{20}$=1.5250 |
| 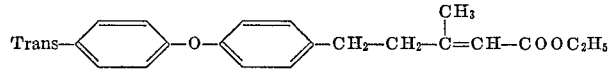 | $n_D^{20}$=1.5563 |
| 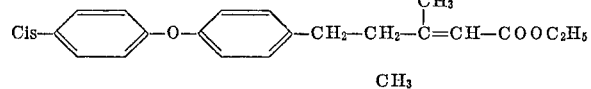 | B.P.: 160–170° C./ 0.001 Torr. |
| 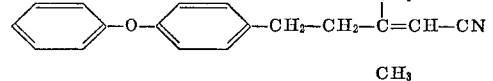 | $n_D^{20}$=1.5737 |
| 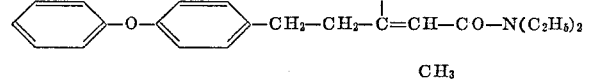 | $n_D^{20}$=1.5600 |
| 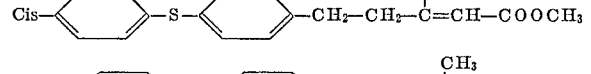 | $n_D^{20}$=1.5870 |
| 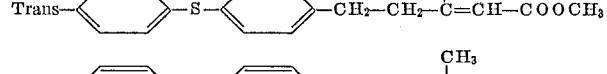 | $n_D^{20}$=1.5918 |
| 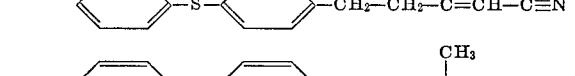 | $n_D^{20}$=1.6081 |
| 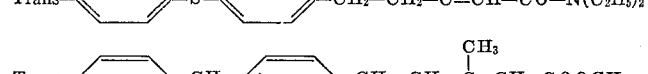 | $n_D^{20}$=1.5586 |
| 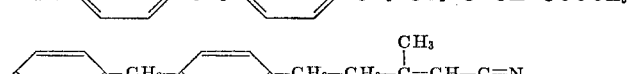 | $n_D^{20}$=1.5578 |
| 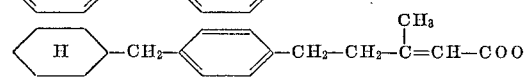 | $n_D^{20}$=1.5738 |
| 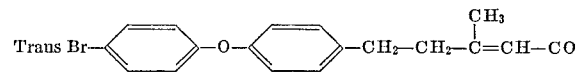 | $n_D^{20}$=1.5252 |
|  | $n_D^{20}$=1.5804 |
|  | Sdp.; 91–93° C. |

TABLE—Continued

| Active substance | Physical data |
|---|---|
| Br—⌬—O—⌬—CH₂—CH₂—C(CH₃)=CH—CO—N(C₂H₅)₂ | $n_D^{20}=1.5705$ |
| Cis-C₂H₅—⌬—O—⌬—CH₂—CH₂—C(CH₃)=CH—COOCH₃ | $n_D^{20}=1.5528$ |
| Trans—⌬—S—⌬—CH₂—CH₂—C(CH₃)=CH—COOCH₃ | $n_D^{20}=1.5918$ |
| Trans C₂H₅—⌬—O—⌬—CH₂—CH₂—C(CH₃)=CH—COOCH₃ | $n_D^{20}=1.5550$ |
| C₂H₅—⌬—O—⌬—CH₂—CH₂—C(CH₃)=CH—C≡N | $n_D^{20}=1.5642$ |
| Trans C₂H₅—⌬—O—⌬—CH₂—CH₂—C(CH₃)=CH—CO—N(C₂H₅)₂ | $n_D^{20}=1.5196$ |
| ⌬—CH₂—O—⌬—CH₂—CH₂—C(CH₃)=CH—COOCH₃ | $n_D^{20}=1.5632$ |
| ⌬—(CH₂)₂—O—⌬—CH₂—CH₂—C(CH₃)=CH—COOCH₃ | $n_D^{20}=1.5573$ |
| ⌬—O—⌬—CH₂—CH₂—C(CH₃)=CH—COOC₃H₇(n)  Cis: trans=5:4 | B.P.: 140–150° C./ 0.001 Torr. |
| ⌬—O—⌬—CH₂—CH₂—C(CH₃)=CH—COOC₃H₇(i)  Cis: trans=3:2 | B.P.: 140–150° C./ 0.001 Torr. |
| ⌬—O—⌬—CH₂—CH₂—C(CH₃)=CH—COOC₄H₉(n)  Cis: trans=3:2 | B.P.: 160–170° C./ 0.001 Torr. |
| ⌬—O—⌬—CH₂—CH₂—C(CH₃)=CH—COOC₄H₉(i)  Cis: trans=3:2 | B.P.: 160–170° C./ 0.001 Torr. |
| ⌬—O—⌬—CH₂—CH₂—C(CH₃)=CH—COOC₄H₉(t)  CH: trans=3:2 | B.P.: 155–162° C./ 0.001 Torr. |
| ⟨H⟩—CH₂—O—⌬—CH₂—CH₂—C(CH₃)=CH—COOCH₃ | $n_D^{20}=1.5266$ |
| ⟨H⟩—CH₂—O—⌬—CH₂—CH₂—C(CH₃)=CH—C≡N | $n_D^{20}=1.5342$ |
| ⟨H⟩—CH₂—O—⌬—CH₂—CH₂—C(CH₃)=CH—CON(C₂H₅)₂ | $n_D^{20}=1.5282$ |
| ⟨H⟩—O—⌬—CH₂—CH₂—C(CH₃)=CH—COOCH₃ | $n_D^{20}=1.5292$ |
| ⟨H⟩—O—⌬—CH₂—CH₂—C(CH₃)=CH—C≡N | $n_D^{20}=1.5392$ |
| ⟨H⟩—O—⌬—CH₂—CH₂—C(CH₃)=CH—CON(C₂H₅)₂ | $n_D^{20}=1.5320$ |
| ⌬—CH₂—CH₂—S—⌬—CH₂—CH₂—C(CH₃)=CH—COOCH₃ | $n_D^{20}=1.5803$ |
| ⌬—CH₂—CH₂—S—⌬—CH₂—CH₂—C(CH₃)=CH—CON(C₂H₅)₂ | $n_D^{20}=1.5761$ |

TABLE—Continued

| Active substance | Physical data |
|---|---|
| H—⌬—S—⌬—CH₂—CH₂—C(CH₃)=CH—COOH₃ | $n_D^{20}=1.5555$ |
| H—⌬—S—⌬—CH₂CH₂—C(CH₃)=CH—CON(C₂H₅)₂ | $n_D^{20}=1.5548$ |
| ⌬—CH₂—S—⌬—CH₂—CH₂—C(CH₃)=CH—COOH₃ | $n_D^{20}=1.5883$ |
| H—⌬—CH₂—S—⌬—CH₂—CH₂—C(CH₃)=CH—COOCH₃ | $n_D^{20}=1.5523$ |
| i-C₅H₁₁—O—⌬—O—⌬—CH₂—CH₂—C(CH₃)=CH—COOCH₃ | $n_D^{20}=1.5475$ |
| n-C₄H₉—O—⌬—O—⌬—CH₂—CH₂—C(CH₃)=CH—COOCH₃ | $n_D^{20}=1.5497$ |
| ⌬—O—⌬—CH₂—CH₂—C(CH₂—CH₃)=CH—COOCH₃ | B.P.: 167° C./ 0.001 Torr. |
| ⌬—O—⌬—CH₂—CH₂—C(CH₂—CH₃)=CH—COOC₂H₅ | B.P.: 168–174° C./ 0.0005 Torr. |
| ⌬—O—⌬—CH₂—CH₂—C(CH₂—CH₃)=CH—C≡N | B.P.: 174–178° C./ 0.001 Torr. |
| ⌬—O—⌬—CH₂—CH₂—C(CH₂—CH₂—CH₃)=CH—COOCH₃ | $n_D^{20}=1.5483$ |
| ⌬—O—⌬—CH₂—CH₂—C(CH₂—CH₂—CH₃)=CH—COOC₂H₅ | $n_D^{20}=1.5427$ |
| ⌬—O—⌬—CH₂—CH₂—C(CH₂—CH₂—CH₃)=CH—C≡N | $n_D^{20}=1.5609$ |
| ⌬—O—⌬—CH₂—CH₂—C(CH₂—CH₂—CH₃)=CH—CON(C₂H₅)₂ | $n_D^{20}=1.5433$ |
| ⌬—O—⌬—CH₂—CH₂—C(CH₃)=CH—COOCH₂—CH=CH₂ | |
| ⌬—O—⌬—CH₂—CH₂—C(CH₃)=CH—COOCH₂—C≡CH | |
| NO₂—⌬—O—⌬—CH₂—CH₂—C(CH₃)=CH—COOCH₃ | B.P.: 80° C. |
| ⌬—O—⌬—CH₂—CH₂—CH=CH—COOCH₃ | |
| ⌬—O—⌬—CH₂—CH₂—CH=C—COOC₂H₅ | |

EXAMPLE 2

(a) Action against *Dysdercus fasciatus*

10 *Dysdercus fasciatus* larvae were treated topically with a solution of active substance in acetone in a concentration of 5γ 8 to 10 days before they are due to shed and emerge to the adult stage. The larvae were then kept at 28° C. and 80–90% relative humidity. They were fed with meal made from pre-moistened cotton seeds.

After about 10 days, i.e. as soon as the controls had shed and emreged fully to the adult stage, the test subjects were examined. Next to normal adults and dead larvae or pupae, special forms such as "super larvae" (larvae in which additional shedding occurs) and "adultoids" (adults with larval features) were found. The special forms are nonviable development stages which are not found in the normal development cycle.

The following table lists the number of normal animals which were found at the indicated concentration. No normal adults denotes 100% hormonal action.

| Active substance | Number of normal adults |
|---|---|
| Cis- 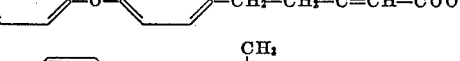 | 2 |
| Trans- 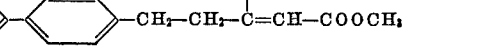 | 0 |
| 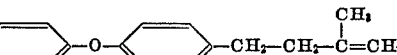 | 2 |
| Trans-  | 0 |
| Cis- 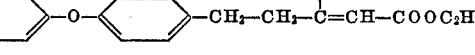 | 0 |
| 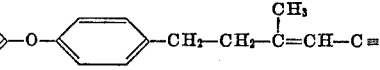 | 0 |
|  | 0 |
| Trans- 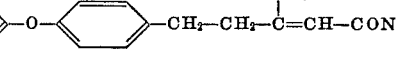 | 0 |
| 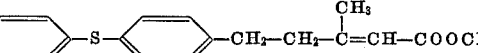 | 0 |
| 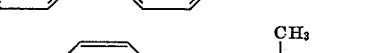 | 0 |
| 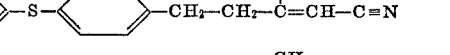<br>Trans | 0 |
| 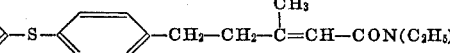 | 0 |
|  | 2 |
| Trans C₂H₅- 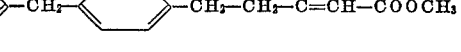 | 0 |
| <br>Cis: trans=5:4 | 0 |
| 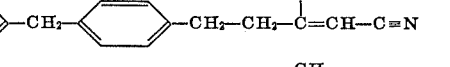<br>Cis: trans=3:2 | 0 |
| 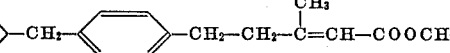<br>Cis:trans=3:2 | 0 |
| 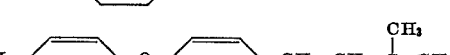<br>Cis:trans=3:2 | 0 |
| 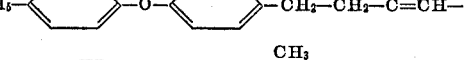<br>Cis:trans=3:2 | 0 |

TABLE—Continued

| Active substance | Number of normal adults |
|---|---|
| Ph-CH₂-CH₂-S-C₆H₄-CH₂-CH₂-C(CH₃)=CH-COOCH₃ | 0 |
| H-C₆H₁₀-S-C₆H₄-CH₂-CH₂-C(CH₃)=CH-COOH₃ | 0 |
| Ph-CH₂-S-C₆H₄-CH₂-CH₂-C(CH₃)=CH-COOH₃ | 0 |
| H-C₆H₁₀-CH₂-S-C₆H₄-CH₂-CH₂-C(CH₃)=CH-COOCH₃ | 0 |
| Ph-O-C₆H₄-CH₂-CH₂-C(CH₂-CH₃)=CH-COOCH₃ | |
| Ph-O-C₆H₄-CH₂-CH₂-C(CH₂-CH₃)=CH-COOC₂H₅ | 0 |
| Ph-O-C₆H₄-CH₂-CH₂-C(CH₂-CH₃)=CH-C≡N | 0 |

(b) Action against Dermestes spp.

10 Dermestes spp. pupae which had just shed were treated topically with a solution of active substance in acetonic in a concentration of 5γ. The test subjects were then kept at 28° C. and 80–90% relative humidity.

The following table lists the number of normal animals which were found at the indicated concentration. No normal adults denotes 100% hormonal action.

| Active substance | Number of normal adults |
|---|---|
| Trans-C₆H₄-O-C₆H₄-CH₂-CH₂-C(CH₃)=CH-COOCH₃ | 0 |
| Trans-C₆H₄-O-C₆H₄-CH₂-CH₂-C(CH₃)=CH-COOC₂H₅ | 1 |
| Cis-C₆H₄-O-C₆H₄-CH₂-CH₂-C(CH₃)=CH-COOC₂H₅ | 0 |
| Ph-O-C₆H₄-CH₂-CH₂-C(CH₃)=CH-CON(C₂H₅)₂ | 0 |
| Trans-C₆H₄-S-C₆H₄-CH₂-CH₂-C(CH₃)=CH-COOCH₃ | 0 |
| Ph-S-C₆H₄-CH₂-CH₂-C(CH₃)=CH-CON(C₂H₅)₂ | 0 |
| Trans-C₆H₄-CH₂-C₆H₄-CH₂-CH₂-C(CH₃)=CH-COOCH₃ | 2 |
| H-C₆H₁₀-CH₂-C₆H₄-CH₂-CH₂-C(CH₃)=CH-COOCH₃ | 0 |
| Br-C₆H₄(Trans)-O-C₆H₄-CH₂-CH₂-C(CH₃)=CH-COOCH₃ | 2 |
| C₂H₅-C₆H₄(Trans)-O-C₆H₄-CH₂-CH₂-C(CH₃)=CH-COOCH₃ | 1 |

TABLE—Continued

| Active substance | Number of normal adults |
|---|---|
| 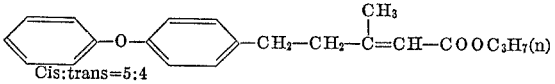 Cis:trans=5:4 | 0 |
| 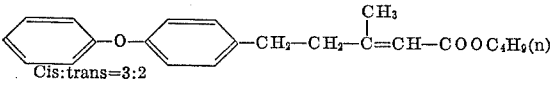 Cis:trans=3:2 | 0 |
| 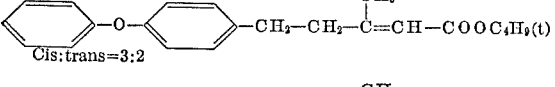 Cis:trans=3:2 | 0 |
| 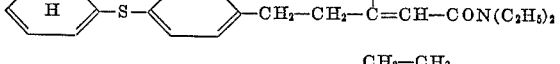 | 1 |
| 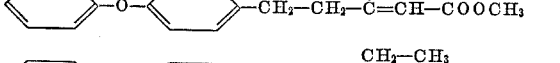 | 0 |
| 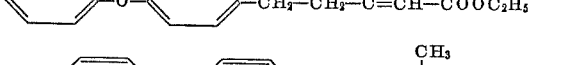 | 0 |
| 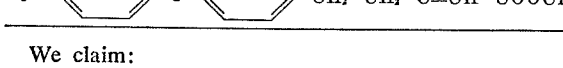 | 0 |

We claim:

1. A compound of the formula

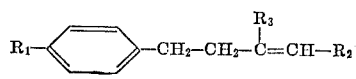

wherein $R_1$ represents a phenoxy, radical which is optionally substituted by halogen, $C_1$–$C_5$ alkyl or $C_1$–$C_5$ alkoxy, $R_2$ represents an alkoxycarbonyl, alkenyloxycarbonyl, or alkinyloxycarbonyl radical and $R_3$ represents hydrogen or $C_1$–$C_5$ alkyl.

2. A compound according to Claim 1 of the formula

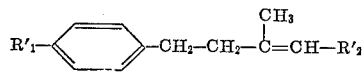

wherein $R'_1$ represents a phenoxy radical which is optionally substituted by $C_1$–$C_4$ alkyl and $R'_2$ represents methoxy-, ethoxy-, isopropoxy-, allyloxy-, or propargyloxycarbonyl.

3. The compound according to claim 2, of the formula

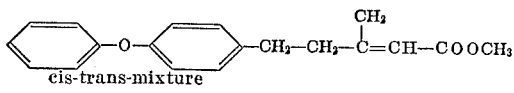
cis-trans-mixture

4. The compound according to claim 2 of the formula

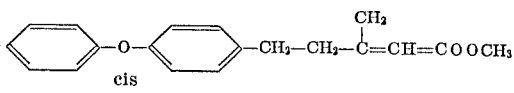
cis

5. The compound according to claim 2 of the formula

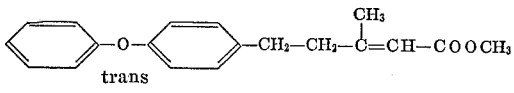
trans

6. The compound according to claim 2 of the formula

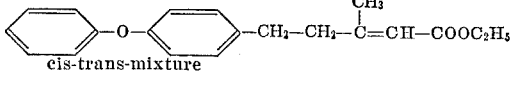
cis-trans-mixture

7. The compound according to claim 2 of the formula

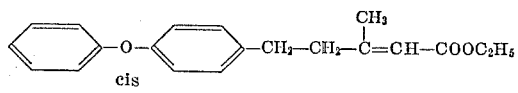
cis

8. The compound according to claim 2 of the formula

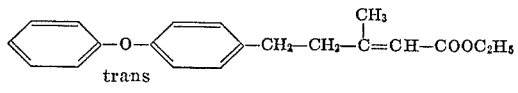
trans

9. The compound according to claim 2 of the formula

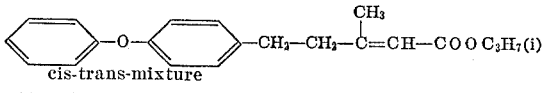
cis-trans-mixture

10. The compound according to claim 2 of the formula

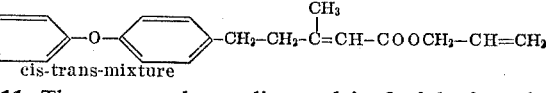
cis-trans-mixture

11. The compound according to claim 2 of the formula

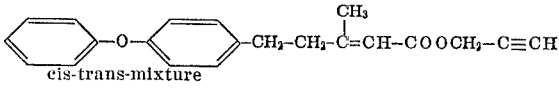
cis-trans-mixture

References Cited

UNITED STATES PATENTS 3,600,437  8/1971  Marshall.
3,739,015  6/1973  Wattanabe et al. ___ 260—473 R

OTHER REFERENCES

March: "Advance Organic Chemistry," McGraw-Hill Co. (1968), pp. 702–709.

LORRAINE A. WEINBERGER, Primary Examiner

J. F. TERAPANE, Assistant Examiner

U.S. Cl. X.R.

260—410.9 R, 410.9 N, 465 F, 465 K, 469, 470, 471 R, 558 R, 558 S, 559 D, 559 T, 590; 424—304, 308, 309, 324